United States Patent [19]

Nagata et al.

[11] Patent Number: 5,753,730
[45] Date of Patent: May 19, 1998

[54] PLASTIC LENSES HAVING A HIGH-REFRACTIVE INDEX, PROCESS FOR THE PREPARATION THEREOF AND CASTING POLYMERIZATION PROCESS FOR PREPARING SULFUR-CONTAINING URETHANE RESIN LENS AND LENS PREPARED THEREBY

[75] Inventors: Teruyuki Nagata; Koju Okazaki, both of Fukuoka-ken; Tohru Miura, Chiba-ken; Nobuyuki Kajimoto, Kanagawa-ken; Yoshinobu Kanemura, Kanagawa-ken; Katsuyoshi Sasagawa, Kanagawa-ken; Masao Imai, Kanagawa-ken, all of Japan

[73] Assignee: Mitsui Toatsu Chemicals, Inc., Tokyo, Japan

[21] Appl. No.: 700,508

[22] Filed: May 15, 1991

Related U.S. Application Data

[63] Continuation-in-part of Ser. No. 311,353, Feb. 15, 1989, abandoned, and a continuation-in-part of Ser. No. 548,623, Jul. 5, 1990, abandoned, which is a continuation-in-part of Ser. No. 357,962, May 30, 1989, abandoned, which is a continuation-in-part of Ser. No. 130,650, Dec. 9, 1987, abandoned, said Ser. No. 548,623, is a continuation-in-part of Ser. No. 361,764, May 30, 1989, abandoned, which is a continuation of Ser. No. 130,650, Dec. 9, 1987, abandoned.

[30] Foreign Application Priority Data

| Dec. 15, 1986 | [JP] | Japan | 61-298198 |
|---|---|---|---|
| Mar. 10, 1987 | [JP] | Japan | 62-54353 |
| Apr. 15, 1987 | [JP] | Japan | 62-92685 |
| Feb. 17, 1988 | [JP] | Japan | 63-32840 |
| Feb. 17, 1988 | [JP] | Japan | 63-32841 |
| Feb. 22, 1988 | [JP] | Japan | 63-37524 |

[51] Int. Cl.$^6$ ............................................. C08K 5/51
[52] U.S. Cl. .......................... 524/136; 528/67; 528/76; 528/77; 528/78; 528/80; 528/81; 528/85
[58] Field of Search ...................... 524/136; 528/67, 528/76, 77, 79, 80, 81, 85

[56] References Cited

U.S. PATENT DOCUMENTS

| 2,542,386 | 2/1951 | Beattie . | |
| 2,629,662 | 2/1953 | Julian et al. . | |
| 3,944,637 | 3/1976 | Bond et al. . | |
| 3,965,057 | 6/1976 | Ammons et al. | 260/18 TN |
| 4,024,088 | 5/1977 | Godlewski | 260/2.5 A |
| 4,146,696 | 3/1979 | Bond et al. . | |
| 4,220,727 | 9/1980 | Godlewski | 521/110 |
| 4,233,205 | 11/1980 | O'Connor et al. . | |
| 4,258,169 | 3/1981 | Prather et al. | 528/72 |
| 4,343,863 | 8/1982 | Hohokabe et al. . | |
| 4,451,425 | 5/1984 | Meyer . | |
| 4,534,916 | 8/1985 | Wichterle . | |
| 4,594,402 | 6/1986 | Coleman et al. | 528/49 |
| 4,680,369 | 7/1987 | Kajimoto et al. . | |
| 4,689,387 | 8/1987 | Kajimoto et al. . | |
| 4,728,690 | 3/1988 | Lammerting et al. | 524/714 |
| 4,775,733 | 10/1988 | Kanemura et al. | 528/67 |
| 4,791,185 | 12/1988 | Kanemura et al. . | |

FOREIGN PATENT DOCUMENTS

| 0 119 471 | 9/1984 | European Pat. Off. . |
| 235743 | 9/1987 | European Pat. Off. . |
| 271839 | 12/1987 | European Pat. Off. . |
| 0 271 839 B1 | 6/1988 | European Pat. Off. . |
| 268896 | 6/1988 | European Pat. Off. . |
| 56-144129 | 11/1981 | Japan . |
| 57-185315 | 11/1982 | Japan . |
| 59-38044 | 3/1984 | Japan . |
| 60-51707 | 3/1985 | Japan . |
| 60-81220 | 5/1985 | Japan . |
| 60-199016 | 10/1985 | Japan . |
| 60-245622 | 12/1985 | Japan . |
| 60-255835 | 12/1985 | Japan . |
| 62-236818 | 10/1987 | Japan . |
| 1-188511 | 7/1989 | Japan . |

OTHER PUBLICATIONS

Plysurf Series catalog of Dai ichi Kogyo Seiyaku Co., Ltd. (and English Translation).
Rompps Chemire–Lexicon, 1981, pp. 1546; 1977 pp. 3494–3498; and 1985 pp. 3169–3170.

*Primary Examiner*—Paul R. Michl
*Assistant Examiner*—Edward J. Cain
*Attorney, Agent, or Firm*—Burns, Doane, Swecker, & Mathis, L.L.P.

[57] ABSTRACT

One aspect of the present invention relates to a process for preparing plastic lenses having a high-refractive index comprising forming a mixture containing one or more polyisocyanate compounds; one or more active hydrogen compounds selected from the group consisting of a polyol compound having no sulfur atom, a polyol compound having at least one sulfur atom, and a polythiol compound having at least one sulfur atom in addition to the sulfur atom contained in mercapto group and at least one internal releasing agent and then casting and polymerizing the mixture.

A second aspect of the present invention relates to a process for preparing a sulfur-containing urethane resin lens is here disclosed which comprises mixing polyisocyanate having two or more isocyanato groups, polythiol having two or more thiol groups and one or more surface active agent selected from the group consisting of fluorine-containing nonionic surface active agents, silicone-containing nonionic surface active agents, alkyl quaternary ammonium salts and acid phosphoric esters and then cast polymerizing the mixture in a mold made of a glass or a metal. Lenses prepared by the processes are also disclosed.

26 Claims, No Drawings

PLASTIC LENSES HAVING A HIGH-REFRACTIVE INDEX, PROCESS FOR THE PREPARATION THEREOF AND CASTING POLYMERIZATION PROCESS FOR PREPARING SULFUR-CONTAINING URETHANE RESIN LENS AND LENS PREPARED THEREBY

CROSS-REFERENCE TO RELATED APPLICATIONS

The present application is a continuation-in-part of U.S. patent application Ser. No. 311,353, now abondoned filed Feb. 15, 1989, and a continuation-in-part of U.S. patent application Ser. No. 548,623, filed Jul. 5, 1990 now abandoned. The latter application is a continuation-in-part of U.S. patent application Ser. No. 07/357,962, filed May 30, 1989, and now abandoned, which was in turn a continuation-in-part of U.S. patent application Ser. No. 07/130,650 filed Dec. 9, 1987, and now abandoned. U.S. patent application Ser. No. 548,623 is also a continuation-in-part of U.S. patent application Ser. No. 07/361,764 filed on May 30, 1989, and now abandoned, which was in turn a continuation of U.S. patent application Ser. No. 07/130,650 filed Dec. 9, 1987, and now abandoned.

BACKGROUND OF THE INVENTION

1. Field of the Invention

The present invention relates to plastic lenses and processes for preparing the same. More specifically, one aspect of the present invention relates to a method for preparing plastic lenses having a high-refractive index, high surface accuracy and excellent optical properties. Another aspect of the present invention relates to a process for preparing a sulfur-containing urethane resin lens which comprises cast polymerizing a mixture of a polyisocyanate having two or more isocyanato groups, a polythiol having two or more thiol groups and a specific surface active agent, and to a lens prepared by the process.

2. Description of the Related Art

Plastic lenses that are used in optical applications must be completely free from bubbles and must have high surface accuracy and optical homogeneity such that no strain can be found by an optical strain meter, and must also have high transparency. Conventionally, diethylene glycol bis (allylcarbonate) (hereinafter abbreviated as DAC), PMMA, and polycarbonates have been used as materials for lenses. Generally, in the process for preparing plastic lenses, cutting and abrading, hot press molding, cast molding, injection molding or the like have been employed. When a thermosetting resin such as DAC is used, cast molding is employed.

In this case, the releasability between the lens and the mold is important. If the release is premature, the lens surface is disordered and the lens tends to exhibit strain. Conversely if the release is difficult, exfoliation of the mold takes place, and exfoliated pieces of the mold stick to the surface of the lens. Although it is known that butyl phosphate is used as an internal release agent for DAC, generally it is not preferable to use an internal release agent in view of the physical properties of the lens (see "Polymer Digest" by Seiichi Mima, 3, 39 (1984).

On the other hand, as a sulfur-containing urethane resin for a lens and a lens prepared therefrom, U.S. Pat. No. 4,689,387 has suggested a thiocarbamic acid S-alkyl ester resin and a lens which can be obtained from a polyisocyanate and a polythiol.

When the thiocarbamic acid S-alkyl ester lens is molded, it is usually impossible to release the polymerized lens from the mold due to excessive adhesion between the lens and the mold.

Therefore, as a method of improving the releasability thereof, a process in which an external release agent is used was proposed by U.S. Pat. No. 4,689,387, and a process in which a polyolefin resin mold is used was proposed by Japanese Patent Laid-Open Publication No. 236818/1987.

However, a process wherein a fluorine type external release agent or a silicone type external release agent is used to form a release film on the mold is accompanied by such problems that it is difficult for the thickness of the release film to be uniform, which makes it difficult to maintain the surface accuracy of the lens. Further, in such a process, a part or all of the release film migrates to the surface of the polymerized lens or into the inside of the polymerized lens and deteriorates the surface state of the lens. In particular, the surface becomes nonuniform and the lens becomes turbid.

In addition, the adhered release agent on the surface of the lens must be removed therefrom, and it is necessary to treat the mold with the release agent every time the mold is used. Thus, the process is intricate and cannot provide high productivity, which means that it is very uneconomical.

As a consequence, a process using an external release agent which involves high cost cannot be employed as an industrial production process.

On the other hand, in a process wherein a mold of a polyolefin resin is employed, the resin mold deforms at elevated temperatures which causes large profile irregularities on the molded lens and thus is impractical for use in the field of optical lenses wherein high surface accuracy is required.

SUMMARY OF THE INVENTION

The present invention overcomes the problems and disadvantages of the prior art by providing, in one aspect, a process for preparing plastic lenses having a high refractive index, superior surface accuracy and superior optical properties than prior art plastic lenses.

One object of the first aspect of the present invention is to provide colorless and transparent plastic lenses suitable for use in eyeglasses and cameras and processes for producing the same.

Another object is to provide plastic lenses having high surface accuracy and excellent optical properties and processes for producing the same.

It is a further object to provide plastic lenses that are lightweight and have a high refractive index and processes for producing the same.

It is an additional object to provide plastic lenses that are excellent in impact resistance and processes for producing the same.

In a second aspect of the present invention, it is an object to provide a process for preparing a sulfur-containing urethane resin lens having high surface accuracy by using a specific surface active agent as an internal release agent.

It is another object to provide a process for preparing a sulfur-containing urethane resin lens having high transparency by using a specific surface active agent as an internal release agent.

It is a further object to provide a process for preparing a sulfur-containing urethane resin lens having good optical homogeneity by using a specific surface active agent as an internal release agent.

It is still another object to provide a process for preparing a sulfur-containing urethane resin lens having excellent optical characteristics by using a specific surface active agent as an internal release agent.

It is a still further object to provide a process for preparing a sulfur-containing urethane resin lens industrially at a high efficiency.

It is still another object to provide a sulfur-containing urethane resin lens prepared by one of the processes as mentioned above.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, a first object of the invention provides a process for preparing plastic lenses having a high refractive index comprising forming a mixture containing (a) one or more polyisocyanate compounds (b) one or more active hydrogen compounds selected from the group consisting of polyol compounds having no sulfur atom, polyol compounds having at least one sulfur atom, and polythiol compounds having at least one sulfur atom in addition to the sulfur atom in the mercapto group and (c) at least one internal releasing agent; casting and polymerizing the mixture to form a lens.

According to the second aspect of the present invention, there is provided a process for preparing a sulfur-containing urethane resin lens comprising pouring a mixture of polyisocyanate compound having two or more isocyanato groups, polythiol compound having two or more thiol groups, and one or more surface active agents selected from the group consisting of fluorine-containing nonionic surface active agents, silicone-containing nonionic surface active agents, alkyl quaternary ammonium salts, and acid phosphoric esters into a mold made of a glass or metal, heating and cast polymerizing the mixture.

The lenses of the invention are lightweight, excellent in impact resistance, have high surface accuracy, high refractive index, excellent optical properties, are colorless and transparent and thus are suitable for use as eyeglass lenses and camera lenses.

It has been discovered that when an internal releasing agent is added to a monomer mixture prior to casting and polymerizing the same, plastic lenses having high surface accuracy and excellent optical properties can be manufactured extremely efficiently on an industrial scale using a glass mold without any specific mold release treatment on the mold surface.

DESCRIPTION OF THE PREFERRED EMBODIMENTS

Reference will now be made in detail to the present preferred embodiments of the invention. Exemplary suitable internal releasing agents for use in the process of the first aspect of the invention include fluorine-containing nonionic surface active agents, silicone-containing nonionic surface active agents, alkyl quaternary ammonium salts, acid phosphoric esters, liquid paraffins, waxes, higher fatty acids and metallic salts thereof, higher fatty esters, higher fatty alcohols, bisamides, polysiloxanes and aliphatic amine ethylene oxide adducts. The most suitable internal releasing agent for any particular application can be selected based upon the combination of monomers employed, the conditions for polymerization, economy and ease of handling.

The internal releasing agents may be used alone or in the form of a mixture of two or more thereof.

The surface active agent used in the second aspect of the present invention is one or more selected from the group consisting of acid phosphoric esters, alkyl quaternary ammonium salts, fluorine-containing nonionic surface active agents and silicone-containing nonionic surface active agents. The surface active agents will be selected depending on the combination of monomers used, the polymerization conditions, and the economics or ease of handling of the surface active agent.

The fluorine-containing nonionic surface active agents, which may be used in the present invention, are compounds having a perfluoroalkyl group and a hydroxyalkyl group or a phosphoric ester group. Exemplary fluorine-containing nonionic surface active agents which are commercially available include UNIDAIN™: DS-401 and DS-403 (products of Daikin Kogyo Co., Ltd.), F-TOP™: EF122A, EF126 and EF301 (products of Shinakita Chemical, Co., Ltd.).

The silicone-containing nonionic surface active agents are compounds having a dimethylpolysiloxane group and a hydroxyalkyl group or a phosphoric ester group, and a typical example is Q2-120A of Dow Chemicals Co.

The alkyl quaternary ammonium salts which may be used in the present invention are known as cationic surface active agents. Exemplary suitable alkyl quaternary ammonium salts for use in the process of the invention include halogen salts, phosphates and sulfates of alkyl quaternary ammonium. Exemplary suitable chlorides thereof include trimethylcetylammonium chloride, trimethylstearylammonium chloride, dimethylethylcetylammonium chloride, triethyldodecylammonium chloride, trioctylmethylammonium chloride, trioctyldodecylammonium chlorides and diethylcyclohexyldodecylammonium chloride.

Exemplary suitable acid phosphoric esters for use in the present invention include isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecyl acid phosphate and bis(tridecyl) acid phosphate.

Exemplary suitable metallic salts of the higher fatty acids useful as the internal releasing agent in the present invention include zinc salts, calcium salts, magnesium salts, nickel salts, copper salts and other salts of stearic acid, oleic acid, octanoic acid, lauric acid, behenic acid and ricinoleic acid. Exemplary suitable metallic salts include zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate and copper palmitate.

Exemplary suitable higher fatty esters useful as the internal releasing agent in the present invention include esters of higher fatty acids such as stearic acid, oleic acid, octanoic acid, lauric acid and ricinoleic acid and alcohols such as ethylene glycol, dihydroxypropane, dihydroxybutane, neopentyl glycol and dihydroxyhexane.

In the first aspect of the invention, the amount of the internal releasing agent, which may be used alone or as a mixture of two or more, is from about 0.1 to about 10,000 ppm, preferably from about 1 to about 10,000 ppm, more preferably from about 1 to about 5,000 ppm with respect to the total weight of a monomer mixture.

When the amount of internal releasing agent is less than 0.1 ppm, mold release characteristics are poor; when it is in excess of 10,000 ppm, turbidity takes place in the prepared lenses, and each lens is prematurely separated from the mold during polymerization and the surface accuracy of the lenses deteriorates.

In the second aspect of the invention, the amount of the surface active agent to be used or the amount of a mixture of the surface active agents to be used ranges from about 1 to about 10,000 ppm, preferably from about 1 to about 5,000 ppm, based on the total amount of the polyisocyanate and the polythiol. If the amount of the surface active agent to be used is below 1 ppm, the releasability becomes extremely poor, while if the amount is greater than 10,000 ppm, release of the molded product will take place during the cast polymerization, which is not preferable because not only the surface accuracy of the lens will be deteriorated but also the produced lens will become turbid and have a white color.

Exemplary suitable polyisocyanate compounds useful in the process of the invention include aliphatic polyisocyanate compounds such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, 2,5,7-trimethyl-1,8-diisocyanato-5-isocyanatomethyloctane bis (isocyanatoethyl) carbonate, bis(isocyanatoethyl) ether, 1,4-butylene glycol dipropyl ether-ω,ω'-diisocyanate, lysine diisocyanatomethyl ester, lysine triisocyanate, 2-isocyanatoethyl-2,6-diisocyanato hexanoate, and 2-isocyanatopropyl-2,6-diisocyanato hexanoate.

Exemplary suitable aliphatic isocyanates having an aromatic ring include m-xylylene diisocyanate, p-xylylene diisocyanate, tetrachloro-m-xylylene diisocyanate, 1,3-bis (α,α,-dimethylisocyanatomethyl)benzene, 1,4-bis(α,α,-dimethylisocyanatomethyl)benzene, bis(isocyanatoethyl) benzene, bis(isocyanatopropyl)benzene, bis (isocyanatobutyl)benzene, α,α,α',α'-tetramethylxylylene diisocyanate, bis(isocyanatomethyl)naphthalene, bis (isocyanatomethyl) diphenylether, bis(isocyanatoethyl) phthalate, mesitylene triisocyanate, and 2,6-di (isocyanatomethyl)furan.

Exemplary suitable alicyclic isocyanates include isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimer acid diisocyanate, 2-isocyanatomethyl-3-(3-isocyanato propyl)-5-isocyanatomethyl-bicyclo[2,2,1]-heptane, 2-isocyanatomethyl-3-(3-isocyanato propyl)-6-isocyanato methyl-bicyclo[2,2,1]-heptane, 2-isocyanato methyl-2-(3-isocyanatopropyl)-5-isocyanato methyl-bicyclo-[2,2,1]-heptane, 2-isocyanatomethyl-2-(3-isocyanatopropyl)-6-isocyanato methyl-bicyclo-[2,2,1]-heptane, 2-isocyanatomethyl-3-(3-isocyanatopropyl)-5-(2-isocyanato ethyl)-bicyclo-[2,2,1]-heptane, 2-isocyanatomethyl-3-(3-isocyanatopropyl)-6-(2-isocyanato ethyl)-bicyclo-[2,2,1]-heptane, 2-isocyanato methyl-2-(3-isocyanatopropyl)-5-(2-isocyanatoethyl) bicyclo-[2,2,1]-heptane, and 2-isocyanatomethyl-2-(3-isocyanatopropyl)-6-(2-isocyanatoethyl)-bicyclo-[2,2,1]-heptane.

Exemplary suitable aromatic isocyanates include phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine isocyanate, 4,4'-diphenylmethane diisocyanate (MDI), 3,3'-dimethyldiphenylmethane-4,4'-diisocyanate, dibenzyl-4,4'-diisocyanate, bis (isocyanatophenyl)ethylene, 3,3'-dimethoxybiphenyl-4,4'-diisocyanate, triphenylmethane triisocyanate, polymeric MDI, naphthalene triisocyanate, diphenylmethane 2,4,4'-triisocyanate, 3-methyldiphenylmethane 4,6,4'-triisocyanate, 4-methyldiphenylmethane3,5,2',4',6'-pentaisocyanate, phenylisocyanatomethyl isocyanate, phenylisocyanatoethyl isocyanate, tetrahydronaphthalene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate, and dichlorocarbazole diisocyanate. In addition, halogen-substituted compounds such as chlorine-substituted compounds, and bromine-substituted compounds, alkyl-substituted compounds, alkoxy-substituted compounds, and nitro-substituted compounds of these polyisocyanates, prepolymer type modified compounds of these polyisocyanates with polyhydric alcohols, carbodiimide-modified compounds of these polyisocyanates, urea-modified compounds of these polyisocyanates, biuret-modified compounds of these polyisocyanates, dimerized products of these polyisocyanates, and trimerized products of these polyisocyanates can also be used. These may be used alone or in a mixture of two or more polyisocyanate compounds.

Exemplary polyol compounds that contain no sulfur atom suitable for use in the process of the first aspect of the invention include ethylene glycol, diethylene glycol, propylene glycol, dipropylene glycol, butylene glycol, neopentyl glycol, glycerin, trimethylolethane, trimethylolpropane, butanetriol, 1, 2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexanetriol, triglycerol, diglycerol, triethylene glycol, polyethylene glycol, tris(2-hydroxyethyl) isocyanurate, cyclobutanediol, cyclopentanediol, cyclohexanediol, cycloheptanediol, cyclooctanediol, cyclohexane dimethanol, hydroxypropyl-cyclohexanol, tricyclo $(5,2,1,0^{2,6})$ decane dimethanol, bicyclo(4,3,0)nonanediol, dicyclohexanediol, tricyclo(5,3,1,1)dodecanediol, bicyclo (4,3,0)nonane dimethanol, tricyclo(5,3,1,1)dodecane diethanol, hydroxypropyltricyclo(5,3,1,1)dodecanol, spiro (3,4)octanediol, butylcyclohexanediol, 1,1'-bicyclohexylidenediol, cyclohexanetriol, maltitol, lactitol, dihydroxy-naphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis-(2-hydroxyethyl ether), tetrabromobisphenol A, tetrabromobisphenol A-bis(2-hydroxyethylether), dibromoneopentyl glycol and epoxy resin; condensation reaction products of these polyols and organic polybasic acids such as oxalic acid, glutamic acid, adipic acid, acetic acid, propionic acid, cyclohexanecarboxylic acid, β-oxycyclohexanepropionic acid, dimer acid, phthalic acid, isophthalic acid, salicylic acid, 3-bromopropionic acid, 2-bromoglycolic acid, dicarboxycyclohexane, pyromellitic acid, butanetetracarboxylic acid and bromophthalic acid; addition reaction products of the polyol compounds and alkylene oxides such as ethylene oxide and propylene oxide; and addition reaction products of alkylene polyamines and alkylene oxides such as ethylene oxide and propylene oxide.

Furthermore, halogen-substituted compounds such as chlorine-substituted and bromine-substituted compounds of the polyol compounds may also be employed.

Exemplary polyol compounds containing at least one sulfur atom suitable for use in the process of the first aspect of the invention include bis[4-(hydroxyethoxy)phenyl] sulfide, bis[4-(2-hydroxypropoxy)phenyl] sulfide, bis-[4-(2, 3-dihydroxypropoxy)phenyl] sulfide, bis-[4,(4-hydroxycyclohexyloxy)] sulfide, bis-[2-methyl-4-(hydroxyethoxy)-6-butylphenyl] sulfide and compounds prepared by adding ethylene oxide and/or propylene oxide to these sulfides in a ratio of three or less molecules of the oxide per hydroxyl group of each sulfide on the average, di-(2-hydroxyethyl) sulfide, 1,2-bis-(2-hydroxyethylmercapto)ethane, bis-(2-hydroxyethyl) disulfide, 1,4-dithian-2, 5-diol, bis(2,3-dihydroxypropyl) sulfide, tetrakis(4-hydroxy-2-thiabutyl)methane, bis(4-hydroxyphenyl) sulfone (trade name Bisphenol S), tetrabromobisphenol S, tetramethylbisphenol S, 4,4'-thiobis(6-tertbutyl-3-methylphenol) and 1,3-bis(2-hydroxyethylthioethyl)cyclohexane. Halogen-substituted compounds such as chlorine-substituted and bromine-substituted compounds of the polyol compounds may also be employed.

Exemplary suitable polythiol compounds having at least one sulfur atom in addition to the sulfur atom in mercapto group useful in the process of the invention include aromatic polythiol compounds such as 1,2-bis(mercaptomethylthio) benzene, 1,3-bis(mercaptomethylthio)benzene, 1,4-bis (mercaptomethylthio)benzene, 1,2-bis(mercaptoethylthio) benzene, 1,3-bis(mercaptoethylthio)benzene, 1,4-bis (mercaptoethylthio)benzene, 1,2,3-tris(mercaptomethylthio) benzene, 1,2,4-tris(mercaptomethylthio)benzene, 1,3,5-tris (mercaptomethylthio)benzene, 1,2,3-tris(mercaptoethylthio) benzene, 1,2,4-tris(mercaptoethylthio)benzene, 1,3,5-tris (mercaptoethylthio)benzene, 1,2,3,4-tetrakis (mercaptomethylthio)benzene, 1,2,3,5-tetrakis (mercaptomethylthio)benzene, 1,2,4,5-tetrakis (mercaptomethylthio)benzene, 1,2,3,4-tetrakis (mercaptoethylthio)benzene, 1,2,3,5-tetrakis (mercaptoethylthio)benzene, 1,2,4,5-tetrakis (mercaptoethylthio)benzene and their nucleus-alkylated compounds; aliphatic polythiol compounds such as bis (mercaptomethyl) sulfide, bis(mercaptoethyl) sulfide, bis (mercaptopropyl) sulfide, bis(mercaptomethylthio)methane, bis(2-mercaptoethylthio)methane, bis(3-mercaptopropylthio)methane, 1,2-bis(mercaptomethylthio) ethane, 1,2-bis(mercaptoethylthio)ethane, 1,2-bis(3-mercaptopropylthio)ethane, 1,3-bis(mercaptomethylthio) propane, 1,3-bis(2-mercaptoethylthio)propane, 1,3-bis(3-mercaptopropylthio)propane, 1,2,3-tris (mercaptomethylthio)propane, 1,2,3-tris(2-mercaptoethylthio)propane, 1,2,3-tris(3-mercaptopropylthio)propane, tetrakis (mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithiane, bis (mercaptomethyl) disulfide, bis(mercaptoethyl) disulfide, bis(mercaptopropyl) disulfide, and esters of these compounds and thioglycolic acid or mercaptopropionic acid, hydroxymethyl sulfide bis(2-mercapto acetate), hydroxymethyl sulfide bis(3mercapto propionate), hydroxyethyl sulfide bis(2-mercapto acetate), hydroxyethyl sulfide bis(3-mercapto propionate), hydroxypropyl sulfide bis(2-mercapto acetate), hydroxypropyl sulfide bis(3-mercapto propionate), hydroxymethyl disulfide bis(2-mercapto acetate), hydroxymethyl disulfide bis(3-mercapto propionate), hydroxyethyl disulfide bis(2-mercapto acetate), hydroxyethyl disulfide bis(3-mercapto propionate), hydroxypropyl disulfide bis(2-mercapto acetate), hydroxypropyl disulfide bis(3-mercapto propionate), 2-mercapto ethyl ether bis(2-mercapto acetate), 2-mercapto ethyl ether bis(3-mercapto propionate), 1,4-dithian-2,5-diolbis(2-mercapto acetate), 1,4-dithian-2,5-diolbis(3-mercapto propionate), thiodiglycolic acid bis(2-mercapto ethyl ester), thiodipropionic acid bis(2-mercapto ethyl ester), 4,4-thiodibutylic acid bis(2-mercapto ethyl ester), dithiodiglycolic acid bis(2-mercapto ethyl ester), dithiodipropionic acid bis(2-mercapto ethyl ester), 4,4-dithiodibutylic acid bis(2-mercapto ethyl ester), thiodiglycolic acid bis(2,3-dimercapto propyl ester), thiodipropionic acid bis(2,3-dimercapto propyl ester), dithioglycolic acid bis(2,3-dimercapto propyl ester) and dithiopropionic acid bis(2,3-dimercapto propyl ester) except bis(2-mercaptoethyl) sulfide; and heterocyclic compounds such as 3,4-thiophenedithiol, bismuthiol and 2,5-dimercapto-1,3,4-thiadiazole. In addition, halogen-substituted compounds such as chlorine-substituted and bromine-substituted compounds may be employed.

The active hydrogen compounds may be used alone or in the form of a mixture of two or more thereof.

In the first aspect of the invention, the molar ratio of the polyisocyanate compound to the active hydrogen compound is from about 0.5 to about 3.0, preferably from about 0.5 to about 1.5 of functional isocyanate group per mole of functional (SH+OH) group.

In the second aspect of the invention, at least one polythiol having two or more thiol groups is used.

Examples of polythiols having two or more thiol groups include aliphatic polythiols such as methanedithiol, 1,2-ethanedithiol, 1,1-propanedithiol, 1,2-propanedithiol, 1,3-propanedithiol, 1,4-butanedithiol, 2,2-propanedithiol, 1,6-hexanedithiol, 1,2,3-propanetrithiol, 1,2,2-dimethylpropane-1,3-dithiol, 3,4-dimethoxybutane-1,2-dithiol, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptopropionate), diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl) -1,3-propanedithiol, di(2-mercaptoethyl)ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), dipentaerythritol hexakis(2-mercaptoacetate), and dipentaerythritol hexakis(3-mercaptopropionate), halogen-substituted compounds of these polythiols such as chlorine-substituted compounds and bromine-substituted compounds of these polythiols, alicyclic polythiols such as 1,1-cyclohexanedithiol, 1,2-cyclohexanedithiol, 2-methylcyclohexane-2,3-dithiol, bicyclo[2,2,1]hepta-exo-cis-2,3-dithiol, 1,1-bis (mercaptomethyl)cyclohexane, and halogen-substituted compounds of these polythiols such as chlorine-substituted compounds and bromine-substituted compounds of these polythiols, polythiols having an aromatic ring such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl) benzene, 1,2-bis(mercaptoethyl)benzene, 1,3-bis (mercaptoethyl)benzene, 1,4-bis(mercaptoethyl)benzene, 1,2-bis(mercaptomethyleneoxy)benzene, 1,3-bis (mercaptomethyleneoxy)benzene, 1,4-bis (mercaptomethyleneoxy)benzene, 1,2-bis (mercaptoethyleneoxy)benzen, 1,3-bis (mercaptoethyleneoxy)benzene, 1,4-bis (mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris-(mercaptomethyl) benzene, 1,3,5-tris(mercaptomethyl)benzene, 1,2,3-tris (mercaptoethyl)benzene, 1,2,4-tris(mercaptoethyl)benzene, 1,3,5-tris(mercaptoethyl)benzene, 1,3,5-tris(3-mercaptopropyl) isocyanurate, 1,2,3-tris (mercaptomethyleneoxy)benzene, 1,2,4-tris (mercaptomethyleneoxy)benzene, 1,3,5-tris (mercaptomethyleneoxy)benzene, 1,2,3-tris (mercaptoethyleneoxy)benzene, 1,2,4-tris (mercaptoethyleneoxy)benzene, 1,3,5-tris (mercaptoethyleneoxy)benzene, 1,2,3,4-tetramercaptobenzene, 1,2,3,5-tetramercaptobenzene, 1,2,4, 5-tetramercaptobenzene, 1,2,3,4-tetrakis(mercaptomethyl) benzene, 1,2,3,5-tetrakis(mercaptomethyl)benzene, 1,2,4,5-tetrakis(mercaptomethyl)benzene, 1,2,3,4-tetrakis (mercaptoethyl)benzene, 1,2,3,5-tetrakis(mercaptoethyl) benzene, 1,2,4,5-tetrakis(mercaptoethyl)benzene, 1,2,3,4-tetrakis(mercaptomethyleneoxy)benzene, 1,2,3,5-tetrakis (mercaptomethyleneoxy)benzene, 1,2,4,5-tetrakis (mercaptomethyleneoxy)benzene, 1,2,3,4-tetrakis (mercaptoethyleneoxy)benzene, 1,2,3,5-tetrakis (mercaptoethyleneoxy)benzene, 1,2,4,5-tetrakis (mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, o-xylylenedithiol, m-xylylenedithiol, p-xylylenedithiol, 1,4-naphthalenedithiol, 1,5-naphthalenedithiol, 2,6-naphthalenedithiol, 2,7-napthalenedithiol, 4-methyl-1,2-dimercaptobenzene, 2,4-dimethylbenzene-1,3-dithiol, 4,5-dimethylbenzene-1,3-dithiol, 9,10-anthracenedimethanethiol, 1,3-di(p-methoxyphenyl) propane-2,2-dithiol, 1,3-diphenylpropane-2,2-dithiol, phenylmethane-1,1dithiol, and 2,4-di(p-mercaptophenyl) pentane, halogen-substituted aromatic polythiols such as chlorine-substituted products and bromine-substituted products for example 3,6-dichloro-1,2-dimercaptobenzene, 2,5-dichlorobenzene1,3-dithiol, 1,3-di(p-chlorophenyl)propane-2,2-dithiol, 3,4,5-tribromo-1,2-dimercaptobenzene, 3,4,5,6-tetrachloro-1,2-dimercaptobenzene, and 2,3,4,6-tetrachloro-1,5-bis(mercaptomethyl)benzene, and polythiols having a heterocyclic ring such as 1,3,5-tris(3-mercaptopropyl) isocyanurate, 2-methylamino-4,6-dithiol-sym-triazine, 2-ethylamino-4,6-dithiol-sym-triazine, 2-amino-4,6-dithiol-sym-triazine, 2-morpholino-4,6-dithiol-symtriazine, 2-cyclohexylamino-4,6-dithiol-sym-triazine, 2-methoxy-4, 6-dithiol-sym-triazine, 2-phenoxy-4,6-dithiol-sym-triazine, 2-thiobenzeneoxy-4,6-dithiol-symtriazine, and 2-thiobutyloxy-4,6-dithiol-sym-triazine, and halogen-substituted compounds of these polythiol such as chlorine-substituted compounds and bromine-substituted compounds of these polythiols.

These compounds may be used alone or as a mixture of two or more of them.

In the second aspect of the invention, the ratio between the polyisocyanate having two or more isocyanato groups and the polythiol having two or more thiol groups is such that an NCO/SH equivalent ratio is generally in a range of from about 0.5/1.0 to about 3.0/1.0, preferably from about 0.5/1.0 to about 1.5/1.0.

In the plastic lens of the first aspect of the present invention, a urethane resin or thiocarbamic acid S-alkyl ester resin is used as a raw material, and therefore in the plastic lens a urethane bond exists between an isocyanate group and a hydroxyl group, or a thiocarbamic acid S-alkyl ester bond exists between the isocyanate group and a mercapto group. However, the plastic lens of the present case may also contain an allophanate bond, a urea bond, a biuret bond. For example, it may be desirable to further react the isocyanate group with the urethane bond or the thiocarbamic acid S-alkyl ester bond to increase the crosslink density. Such a reaction may be carried out at a temperature of at least 100° C. and the isocyanate component should be used in an excess amount.

Alternatively, an amine compound or the like may also be used to produce a urea bond or biuret bond. When the isocyanate compound is reacted with a compound other than the hydroxyl compound or mercapto compound, attention should be paid to coloring.

Furthermore, in the present invention, various additives may be added to the above-mentioned raw materials. Exemplary suitable additives include a chain extender, a crosslinking agent, a light stabilizer, an ultraviolet absorber, an antioxidant, an oil-soluble dye and a filler.

The reaction rate may be adjusted to a desired level by adding a known reaction catalyst useful in the manufacture of a polyurethane or thiocarbamic acid S-alkyl ester.

The plastic lens of the present invention can be prepared by cast polymerization. One or more of the polyisocyanate compounds and one or more of the active hydrogen compounds are mixed to form a mixture. At least one internal releasing agent is added to the mixture. The resulting mixture is then poured into a mold, followed by the polymerization.

Polymerization is usually carried out at from about −50° C. to about 200° C. and in from about 0.5 to about 72 hours, depending upon the types of monomers and mold releasing agent employed.

The thus polymerized lenses may be subjected to an annealing treatment, if necessary.

In the second aspect of the present invention, there are mixed polyisocyanate having two or more isocyanato groups, polythiol having two or more thiol groups and a surface active agent. If necessary, catalyst and other additives are further mixed therewith.

Furthermore, in the case that there is a possibility that air or the like dissolves in the raw materials during transportation or preparation, the dissolved gas is fully removed from the mixture when needed.

Afterward, the uniformed mixture is cast into a mold and then polymerized.

The mold comprises a combination of a resin gasket and a metal or glass mold, and the material of the mold is preferably glass in view, for example, of the operability, productivity, and the surface accuracy of the lens that will be obtained.

Although the polymerization temperature and the polymerization time are selected suitably depending on the type of monomers, the release agent, the additives such as the catalyst, and the shape and the thickness of the lens to be obtained, polymerization is started at a low temperature, then the temperature is raised, and the polymerization is completed within 3 to 24 hours, preferably at a temperature of from about 30° C. to about 120° C.

The plastic lenses of the present invention have high surface accuracy and excellent optical properties, are lightweight and excellent in impact resistance, and are suitable for lenses of glasses and cameras.

Moreover, the lenses of the present invention can be subjected to physical and chemical treatments such as a surface abrasion treatment, an antistatic treatment, a hard coat treatment, a non-refractive coat treatment, a coloring treatment and a dimming treatment for the prevention of reflection, the enhancement of hardness, the improvement of abrasion resistance and chemical resistance, fog resistance, the supply of fashionability, and the like.

The invention will be further explained by the following examples which are intended to be purely exemplary of the invention. Of the examples, Examples 1–32 and Comparative Examples 1–24 relate to the first aspect of the present invention and Examples 33–57 and Comparative Examples 25–45 relate to the second aspect of the present invention. The refractive index, Abbe's number, mold release characteristics and appearance were evaluated by the following tests in connection with examples relating to the first aspect of the invention:

Refractive index and Abbe's number: Measured at 20° C. by the use of a Pulflich refractometer.

Mold release characteristics: When a polymerized lens was released from a mold without resistance, the mold release characteristics were denoted by "0", and when a part or all of the lens was not released therefrom, they were denoted by "X" and separated by means of driving in a Teflon™ wedge between the lens and the mold.

Appearance: Evaluated by visual observation.

Among the performance tests for the lenses and test pieces, releasability, strain, surface accuracy, and transparency were evaluated by the following methods in connection with examples relating to the second aspect of the invention:

Releasability: When the release was easy after the completion of the polymerization, it was denoted "0", whereas when a part or all of the product was not released after the completion of the polymerization, it was denoted "X".

Strain: The presence of strain was observed by a strain meter, and when there was not strain, it was denoted "0", whereas when there was strain, it was denoted "X".

Surface accuracy: The surface accuracy was observed visually, and when it was good, it was denoted "0", whereas when it was bad, it was denoted "X".

Transparency: The total ray transmittance was determined according to JIS K 7105-1981, and when its value was 85% over and when it was transparent throughout under a slide projector lamp, it was denoted "0", and other cases were denoted "X".

EXAMPLE 1

50 g (0.30 mol) of hexamethylene diisocyanate, 27 g (0.30 mol) of 1,4-butanediol and 0.08 g of dodecanol acid phosphate were mixed. The resulting mixture was then poured into a mold composed of a glass mold and a gasket. Then the mold was gradually heated from room temperature to 120° C. for 24 hours to complete the polymerization. After polymerization, the lens was easily released from the mold. The lens had high surface accuracy and was colorless. Moreover, it had a refractive index $n^{20}$ of 1.50 and an Abbe's number $v^{20}$ of 55.

EXAMPLES 2 to 32

Following the procedure of Example 1, lenses were prepared in composition ratios shown in Table 1. The results of performance tests are set forth in Table 1.

Comparative Examples 1 to 24

Following the procedure of Example 1 with the exception that the undermentioned mold treatments were carried out, lenses were prepared in composition ratios shown in Table 2. The results of performance tests are set forth in Table 2.

(1) No treatment . . . A glass mold was used without any release treatment.

(2) External release treatment . . . External mold releasing agent YSR-6209™ (product of Toshiba Silicon Co.) was applied and baked on the inner surface of a glass mold.

(3) Reuse of external release treatment . . . The glass mold obtained by the external release treatment was once employed for the polymerization and then used again without any further treatment.

(4) Use of PP mold . . . A polypropylene mold was prepared by injection molding and used in place of the glass mold without any surface treatment.

TABLE 1

|  | Polyisocyanate | Active Hydrogen Compound | Internal Releasing Agent | Release Characteristics | Appearance | Refractive Index | Abbe's Number |
|---|---|---|---|---|---|---|---|
| | | | (I) | | | | |
| Example 2 | Dicyclohexylmethane diisocyanate 0.30 mol | 1,4-Butanediol 0.30 mol | UNIDAIN DS-401 200 ppm | o | High surface accuracy, Transparent | 1.52 | 51 |
| Example 3 | Hexamethylene diisocyanate 0.30 mol | Trimethylolpropane 0.20 mol | Trimethylcetylammonium chloride 500 ppm | o | High surface accuracy, Transparent | 1.51 | 54 |
| Example 4 | Dicyclomethane diiso- | Bisphenol A 0.30 mol Trimethylol- | Diisopropylacid | o | High surface accuracy, | 1.54 | 42 |

TABLE 1-continued

|  | Polyiso-cyanate | Active Hydrogen Compound | Internal Releasing Agent | Release Character-istics | Appearance | Refractive Index | Abbe's Number |
|---|---|---|---|---|---|---|---|
|  | cyanate 0.60 mol | propane 0.20 mol | phosphate 1000 ppm |  | Transparent |  |  |
| Example 5 | m-xylylene diiso-cyanate 0.60 mol | 1,4-Cyclohex-anedimethanol 0.15 mol Trimethylol propane 0.10 mol | F-TOP EF301 150 ppm | o | High surface accuracy, Transparent | 1.57 | 36 |
| (II) |
| Example 6 | Isophorone diiso-cyanate 0.60 mol | Bisphenol A 0.30 mol Trimethylol propane 0.20 mol | Octylacid phosphate 500 ppm | o | High surface accuracy, Transparent | 1.54 | 44 |
| Example 7 | Dicyclo-hexyl-methane diiso-cyanate 0.60 mol | 1,4-Cyclohex-anedimethanol 0.30 mol Trimethylol-propane 0.20 mol | Octylacid phosphate 800 ppm | o | High surface accuracy, Transparent | 1.53 | 50 |
| Example 8 | Tolylene diiso-cyanate 0.60 mol | 1,4-Cyclo-hexanedi-methanol 0.30 mol Trimethylol-propane 0.20 mol | Octylacid phosphate 800 ppm | o | High surface accuracy, Transparent | 1.58 | 35 |
| Example 9 | m-Xylylene diiso-cyanate 0.20 mol | Tetrabromo-bisphenol A 0.10 mol Trimethylol-propane 0.06 mol | UNIDAIN DS-401 250 ppm | o | High surface accuracy, Transparent | 1.60 | 33 |
| (III) |
| Example 10 | m-Xylylene diiso-cyanate 0.05 mol | 2-Hydroxyethyl sulfide 0.05 mol | UNIDAIN DS-401 1000 ppm | o | High surface accuracy Transparent | 1.59 | 38 |
| Example 11 | Hexa-methylene diios-cyanate 0.08 mol | Tetrakis-(4-hydroxy-2-thiabutyl) methane 0.04 mol | UNIDAIN DS-401 200 ppm | o | High surface accuracy Transparent | 1.56 | 45 |
| Example 12 | m-Xylylene diiso-cyanate 0.08 mol | Tetrakis-(4-hydroxy-2-thiabutyl) methane 0.04 mol | Diiso-propylacid phosphate 500 ppm | o | High surface accuracy Transparent | 1.61 | 37 |
| Example 13 | Lysine triiso-cyanate 0.04 mol | Tetrakis-(4-hydroxy-2-thiabutyl) methane 0.03 mol | Trimethyl-cetyl-ammonium chloride 1000 ppm | o | High surface accuracy Transparent | 1.57 | 44 |
| Example 14 | m-Xylylene diiso-cyanate 0.08 mol | 1,2-Bis-(2-hydroxyethyl-mercapto)-ethane 0.08 mol | Tridecyl acid phosphate 10000 ppm | o | High surface accuracy Transparent | 1.60 | 38 |
| (IV) |
| Example 15 | Hexa-methylene diiso-cyanate 0.08 mol | 2-Hydoxyethyl sulfide 0.08 mol | F-TOP EF-122A 150 ppm | o | High surface accuracry, Transparent | 1.56 | 44 |
| Example 16 | Tetra-chloro-xylylene diiso-cyanate 0.08 mol | 2-Hydoxyethyl sulfide 0.08 mol | Diiso-propylacid phosphate 800 ppm | o | High surface accuracry, Transparent | 1.61 | 37 |
| Example 17 | m-Xylylene diiso- | Bis[4-(hydroxy- | Trimethyl-cetyl- | o | High surface | 1.61 | 34 |

TABLE 1-continued

| | Polyisocyanate | Active Hydrogen Compound | Internal Releasing Agent | Release Characteristics | Appearance | Refractive Index | Abbe's Number |
|---|---|---|---|---|---|---|---|
| | cyanate 0.08 mol | ethoxyl)-phenyl sulfide 0.08 mol | ammonium chloride 200 ppm | | accuracry, Transparent | | |
| Example 18 | 4,4'-Diphenyl-methane diiso- 0.09 | Bis[4-(hydroxypropoxy)phenyl] sulfide 0.03 mol Bis[4-(2,3-dihydroxypropoxy) phenyl sulfide 0.03 mol | Trimethylcetyl ammonium chloride 200 ppm | ○ | High surface accuracry, Transparent | 1.62 | 31 |

(V)

| | Polyisocyanate | Active Hydrogen Compound | Internal Releasing Agent | Release Characteristics | Appearance | Refractive Index | Abbe's Number |
|---|---|---|---|---|---|---|---|
| Example 19 | m-Xylylene diisocyanate 0.10 mol | Tetrakis(2-mercaptoethylthiomethyl)methane 0.05 mol | Isopropyl acid phosphate 1000 ppm | ○ | High surface accuracy Transparent | 1.66 | 33 |
| Example 20 | m-Xylylene diisocyanate 0.10 mol | Hydroxymethyl sulfide bis(2-mercapto acetate) 0.10 mol | Trimethyl cetyl-ammonium chloride 150 ppm | ○ | High surface accuracy Transparent | 1.60 | 38 |
| Example 21 | m-Xylylene diisocyanate 0.10 mol | 1,2-Di(2-mercapto-ethylthio) ethane 0.10 mol | Tridecyl acid phosphate 500 ppm | ○ | High surface accuracy Transparent | 1.64 | 36 |
| Example 22 | m-Xylylene diisocyanate 0.10 mol | 1,2-Di(2-mercapto-ethylthio) ethane 0.10 mol | Trioctyl-methyl-ammonium chloride 500 ppm | ○ | High surface accuracy Transparent | 1.64 | 36 |
| Example 23 | Hexamethylene diisocyanate 0.10 mol | Tetrakis(2-mercapto-ethylthio-methyl)methane 0.05 mol | UNIDAIN DS-401 (Daikin) 250 ppm | ○ | High surface accuracy Transparent | 1.62 | 42 |

(VI)

| | Polyisocyanate | Active Hydrogen Compound | Internal Releasing Agent | Release Characteristics | Appearance | Refractive Index | Abbe's Number |
|---|---|---|---|---|---|---|---|
| Example 24 | Isophorone diisocyanate 0.10 mol | Tetrakis(2-mercapto-ethylthio-methyl)methane | UNIDAIN DS-401 (Daikin) 100 ppm | ○ | High surface accuracry, Transparent | 1.60 | 40 |
| Example 25 | Tetrachloro-xylylene diisocyanate 0.10 mol | Tetrakis(2-mercapto-ethylthio-methyl)methane | F-TOP EH-126 500 ppm | ○ | High surface accuracry, Transparent | 1.68 | 33 |
| Example 26 | Tetrachloro-xylylene diisocyanate 0.10 mol | Dithiodi-glycolic acid bis(2-mercapto-butyl ester) 0.10 mol | Isopropyl-acid phosphate 800 ppm | ○ | High surface accuracry, Transparent | 1.66 | 33 |
| Example 27 | Tolylene diisocyanate 0.10 mol | Tetrakis(2-mercaptoethyl-thiomethyl)-methane 0.05 mol | Isopropyl acid phosphate 800 ppm | ○ | High surface accuracry, Transparent | 1.68 | 30 |

(VII)

| | Polyisocyanate | Active Hydrogen Compound | Internal Releasing Agent | Release Characteristics | Appearance | Refractive Index | Abbe's Number |
|---|---|---|---|---|---|---|---|
| Example 28 | m-Xylyene diisocyanate 0.10 mol | 1,2-Di(2-mercapto-ethylthio)-ethane 0.02 mol Tetrakis (2-mercaptoethyl-thiomethyl)-methane | Isopropyl acid phosphate 500 ppm | ○ | High surface accuracry, Transparent | 1.65 | 35 |

TABLE 1-continued

| | Polyiso-cyanate | Active Hydrogen Compound | Internal Releasing Agent | Release Characteristics | Appearance | Refractive Index | Abbe's Number |
|---|---|---|---|---|---|---|---|
| Example 29 | m-Xylyene diisocyanate 0.10 mol | 0.04 mol Trimethylol-propnane 0.04 mol 2-Hydroxy-ethyl sulfide 0.04 mol | UNIDAIN DS-401 1000 ppm | ○ | High surface accuracy, Transparent | 1.56 | 38 |
| Example 30 | Hexa-methylene diisocyanate 0.01 mol. | Trimethylol-propane 0.04 mol 1,2-Di(2-mer-captoethyl-thio) ethane 0.04 mol | F-TOP EF-122A 200 ppm | ○ | High surface accuracy, Transparent | 1.57 | 42 |
| (VIII) | | | | | | | |
| Example 31 | Hexa-methylene diisocyanate 0.01 mol | 2-Hydroxyethyl sulfide 0.04 mol 1,2-Di(2-mer-captoethyl-thio) ethane 0.04 mol | Diisopropyl acid phosphate 500 ppm | ○ | High surface accuracy, Transparent | 1.56 | 41 |
| Example 32 | m-Xylylene diisocyanate 0.08 mol Trilendiiso cyanate 0.02 mol | Tetrakis(2-mercapto-ethylthio-methyl)methane 0.04 mol | Isopropyl acid phosphate 800 ppm | ○ | High surface accuracy, Transparent | 1.65 | 34 |

TABLE 2

| | Polyiso-cyanate | Active Hydrogen Compound | Mold Treatment | Release Characteristics | Appearance | Refractive Index | Abbe's Number |
|---|---|---|---|---|---|---|---|
| (I) | | | | | | | |
| Comp. Ex. 1 | Hexa-methylene diisocyanate 0.30 mol | 1,4-Butanediol 0.30 mol | No treatment | X | — | — | — |
| Comp. Ex. 2 | Hexa-methylene diisocyanate 0.30 mol | 1,4-Butanediol 0.30 mol | External release treatment | ○ | Uneven surface, Transparent | 1.50 | 55 |
| Comp. Ex. 3 | Hexa-methylene diisocyanate 0.30 mol | 1,4-Butanediol 0.30 mol | Reuse of external release treatment (mold used in Comp. Ex. 2) | X | — | — | — |
| Comp. Ex. 4 | Hexa-methylene diisocyanate 0.30 mol | 1,4-Butanediol 0.30 mol | Use of PP mold | ○ | Bad surface accuracy, Transparent | 1.50 | 55 |
| (II) | | | | | | | |
| Comp. Ex. 5 | Dicyclo-hexyl methane diisocyanate 0.30 mol | 1,4-Butanediol 0.30 mol | No treatment | X | — | — | — |
| Comp. Ex. 6 | Dicyclo-hexyl methane | 1,4-Butanediol 0.30 mol | External release treatment | ○ | Uneven surface, Transparent | 1.52 | 51 |

TABLE 2-continued

|  | Polyiso-cyanate | Active Hydrogen Compound | Mold Treatment | Release Characteristics | Appearance | Refractive Index | Abbe's Number |
|---|---|---|---|---|---|---|---|
|  | diiso-cyanate 0.30 mol |  |  |  |  |  |  |
| Comp. Ex. 7 | Dicylo-hexyl-methane diiso-cyanate 0.30 mol | 1,4-Butanediol 0.30 mol | Reuse of external release treatment (mold used in Comp. Ex. 6) | X | — | — | — |
| Comp. Ex. 8 | Dicyclo-hexyl methane diiso-cyanate 0.30 mol | 1,4-Cyclo hexanedi-methanol 0.15 mol Trimethylol-propane 0.10 mol | Use of PP mold | ○ | Bad surface accuracy, Transparent | 1.53 | 50 |
| (III) |  |  |  |  |  |  |  |
| Comp. Ex. 9 | Xylylene diiso-cyanate 0.05 mol | 2-Hydroxyethyl sulfide 0.05 mol | No treatment | X | — | — | — |
| Comp. Ex. 10 | Xylylene diiso-cyanate 0.05 mol | 2-Hydroxyethyl sulfide 0.05 mol | External release treatment | ○ | Uneven surface, Transparent | 1.59 | 38 |
| Comp. Ex. 11 | Xylylene diiso-cyanate 0.05 mol | 2-Hydroxyethyl sulfide 0.05 mol | Reuse of external release treatment (mold used in Comp. Ex. 2) | X | — | — | — |
| Comp. Ex. 12 | Xylylene diiso-cyanate 0.05 mol | 2-Hydroxyethyl sulfide 0.05 mol | Use of PP mold | ○ | Bad surface accuracy, Transparent | 1.59 | 38 |
| (IV) |  |  |  |  |  |  |  |
| Comp. Ex. 13 | Lysine triiso-cyanate 0.04 mol | Tetrakis-(4-hydroxy-2-thiabutyl) methane 0.03 mol | No treatment | X | — | — | — |
| Comp. Ex. 14 | Lysine triiso-cyanate 0.04 mol | Tetrakis-(4-hydroxy-2-thiabutyl) methane 0.03 mol | External release treatment | ○ | Uneven surface, Transparent | 1.57 | 44 |
| Comp. Ex. 15 | Lysine triiso-cyanate 0.04 mol | Tetrakis-(4-hydroxy-2-thiabutyl) methane 0.03 mol | Reuse of external release treatment (mold used in Comp. Ex. 6) | X | — | — | — |
| Comp. Ex. 16 | Xylylene diiso-cyanate 0.06 mol | Tetrakis-(4-hydroxy-2-thiabutyl) methane 0.03 mol | Use of PP mold | ○ | Bad surface accuracy, Transparent | 1.61 | 37 |
| (V) |  |  |  |  |  |  |  |
| Comp. Ex. 17 | Xylylene diiso-cyanate 0.10 mol | Tetrakis(2-mercaptoethyl-thiomethyl)-methane 0.05 mol | No treatment | X | — | — | — |
| Comp. Ex. 18 | Xylylene diiso-cyanate 0.10 mol | Tetrakis(2-mercaptoethyl-thiomethyl)-methane 0.05 mol | External release treatment | ○ | Uneven surface, Transparent | 1.66 | 33 |
| Comp. | Xylylene | Tetrakis(2- | Reuse of | X | — | — | — |

TABLE 2-continued

| | Polyisocyanate | Active Hydrogen Compound | Mold Treatment | Release Characteristics | Appearance | Refractive Index | Abbe's Number |
|---|---|---|---|---|---|---|---|
| Ex. 19 | diisocyanate 0.10 mol | mercaptoethylthiomethyl)-methane 0.05 mol | external release treatment (mold used in Comp. Ex. 2) | | | | |
| Comp. Ex. 20 | Xylylene diisocyanate 0.10 mol | Tetrakis(2-mercaptoethylthiomethyl)-methane 0.05 mol | Use of PP mold | o | Bad surface accuracy, Transparent | 1.66 | 33 |
| (VI) | | | | | | | |
| Comp. Ex. 21 | Hexamethylene diisocyanate 0.10 mol | Tetrakis(2-mercaptoethylthiomethyl)methane 0.05 mol | No treatment | X | — | — | — |
| Comp. Ex. 22 | Hexamethylene diisocyanate 0.10 mol | Tetrakis(2-mercaptoethylthiomethyl)methane 0.05 mol | External release treatment | o | Uneven surface, Transparent | 1.62 | 42 |
| Comp. Ex. 23 | Hexamethylene diisocyanate 0.10 mol | Tetrakis(2-mercaptoethylthiomethyl)methane 0.05 mol | Reuse of external release treatment (mold used in Comp. Ex. 6) | X | — | — | — |
| Comp. Ex. 24 | Tetrachloroxylylene diisocyanate 0.10 mol | Dithiodiglycolic acid bis(2-mercapto ethyl ester) 0.10 mol | Use of PP mold | o | Bad surface accuracy, Transparent | 1.66 | 33 |

EXAMPLE 33

94 parts of m-xylylene diisocyanate, 122 parts of pentaerythritol tetrakis(3-mercaptopropionate), 0.05 part of dibutyl tin dilaurate, and 100 ppm of UNIDAIN DS-401 as an internal release agent (a nonionic surface action agent, manufactured by Daikin Kogyo Co.,Ltd.) were mixed, and the resulting mixture was then deaerated for 1 hour. Afterward, the mixture was cast into a mold prepared by combining a gasket with a lens matrix comprising two glass plates, and then was cured at 50° C. for 6 hours, at 80° C. for 2 hours, at 90° C. for 2 hours, and at 110° C. for 2 hours.

After polymerization, the lens was easily released, and the thus obtained lens was colorless and transparent, free from bubbles and strain, and good in surface accuracy. In a similar manner, a test piece was prepared for determining the transmittance and the total ray transmittance was measured and found to be 85%.

EXAMPLES 34–54

In the same manner as Example 33, lenses having compositions as shown in Table 3 were prepared, and the results are shown in Table 3.

EXAMPLE 55

94 parts of m-xylylene diisocyanate, 122 parts of pentaerythritol tetrakis(3-mercaptopropionate), 0.05 part of dibutyl tin dilaurate and 100 ppm of UNIDAIN DS-401 as an internal release agent (product of Daikin Kogyo Co.,Ltd.) were mixed, and the resulting uniform solution was cast into a mold prepared by combining a gasket with a lens matrix comprising two glass plates, and then was cured at 50° C. for 6 hours, at 80° C. for 2 hours, at 90° C. for 2 hours, and at 110° C. for 2 hours.

After the polymerization, the lens was released from the mold with ease. The thus obtained lens was colorless and transparent, free from bubbles and strain, and excellent in surface accuracy. The total ray transmittance was 85%.

EXAMPLE 56

94 parts of m-xylylene diisocyanate, 122 parts of pentaerythritol tetrakis(3-mercaptopropionate), 0.05 part of dibutyl tin dilaurate and 1000 ppm of dioctyl acid phosphate were mixed, and the resulting uniform solution was cast into a mold prepared by combining a gasket with a lens matrix comprising two glass plates, and then was cured at 50° C. for 6 hours, at 80° C. for 2 hours, at 90° C. for 2 hours, and at 110° C. for 2 hours.

After the polymerization, the lens was released from the mold with ease. The thus obtained lens was colorless and transparent, free from bubbles and strain, and excellent in surface accuracy. The total ray transmittance was 85%.

EXAMPLE 57

94 parts of m-xylylene diisocyanate, 122 parts of pentaerythritol tetrakis(3-mercaptopropionate) and 1000 ppm of dioctyl acid phosphate were mixed, and the resulting uniform solution was cast into a mold prepared by combining a gasket with a lens matrix comprising two glass plates, and then was heated and cured at 50° C. for 6 hours, at 80° C. for 6 hours, at 90° C. for 6 hours, and at 120° C. for 10 hours.

After the polymerization, the lens was released from the mold with ease. The thus obtained lens was colorless and transparent, free from bubbles and strain, and excellent in surface accuracy. The total ray transmittance was 85%.

Comparative Example 25

A lens was prepared by the same prodedure as in Example 33 except that DS-401 was not used. After the polymerization, the lens could not be released from the mold.

Comparative Example 26

A lens was prepared by the same procedure as in Example 33 except that an internal release agent was not used and that a mold which had been treated with DIEFREE-MS-181 (a fluorine external release agent, product of Daikin Kogyo Co., Ltd.) as an external release agent was used. After the polymerization, the lens was easily released, but a part of the release agent had migrated to the surface of the lens, so that the lens was partly opaque. The surface accuracy was also poor.

Comparative Example 27

A lens was prepared by the same procedure as in Example 33 except that an internal release agent was not used and that the glass mold was replaced with a polypropylene mold. After the polymerization, the lens was easily released, and the thus obtained lens was colorless and transparent, and free from bubbles and strain, but the surface accuracy was poor.

Comparative Example 28

A lens was prepared by the same procedure as in Example 34 except that the internal release agent QS-120A was not used. After the polymerization, the lens could not be released from the mold.

Comparative Example 29

A lens was prepared by the same procedure as in Comparative Example 26 except that the combination of the monomers in Example 34 was employed. The results are set forth in Table 3.

Comparative Example 30

A lens was prepared by the same procedure as in Comparative Example 35 except that the combination of the monomers in Example 34 was employed. The results are set forth in Table 3.

Comparative Example 31

94 parts of m-xylylene diisocyanate, 122 parts of pentaerythritol tetrakis(3-mercaptopropionate), 0.05 part of dibutyl tin dilaurate and 5,000 ppm of zinc stearate, the internal release agent described in EP 119471, were mixed, and the resulting mixture was then deaerated for 1 hour. Afterward, the mixture was cast into a mold comprising a glass mold and a gasket, and then was heated and cured at 50° C. for 6 hours, at 80° C. for 2 hours, at 90° C. for 2 hours, and at 110° C. for 2 hours.

After the polymerization, the resulting lens in the mold was whitely turbid and could not be released from the mold. As a consequence, the measurement of surface accuracy and optical strain was impossible.

Comparative Examples 32 to 35

Each lens having each composition shown in Table 4 was prepared by the same procedure as in Comparative Example 31 except that zinc stearate was replaced with zinc stearate and lauric acid, zinc stearate and lauryl acid phosphate, zinc stearate and dioctyl acid phosphate, or calcium stearate which are described in EP 119471. The results are set forth in Table 4.

Comparative Example 36

A lens having a composition shown in Table 4 was prepared by the same procedure as in Comparative Example 31 except that zinc stearate was replaced with dimethylglyoxime described in U.S. Pat. No. 4,220,727. The results are set forth in Table 4.

Comparative Example 37

A lens having a composition shown in Table 4 was prepared by the same procedure as in Comparative Example 31 except that zinc stearate was replaced with hardened castor oil mentioned in C.A. 85(8), 47604v. The results are set forth in Table 4.

Comparative Examples 38 and 39

A series of lenses having the compositions shown in Table 4 was prepared by the same procedure as in Comparative Example 31 except that zinc stearate was replaced with oleyl amide oleate or N,N-dimethyloleic amide mentioned in BE 757939 Patent. The results are set forth in Table 4.

Comparative Examples 40, 41 and 42

A series of lenses having the compositions shown in Table 4 was prepared by the same procedure as in Comparative Example 31 except that zinc stearate was replaced with each of silicone oils or wax as known internal release agents mentioned in column 1, lines 35 to 38 of U.S. Pat. No. 4,728,690, i.e., TSF 4300 and TSF 4440 which are silicone oils made by Toshiba Silicone Co., Ltd or a liquid paraffin. The results are set forth in Table 4.

Comparative Example 43

A lens having a composition shown in Table 4 as prepared by the same procedure as in Comparative Example 31 except that zinc stearate was replaced with an oleyl amine ethylene oxide adduct mentioned in Japanese Patent Laid-open Publication No. 51707/1985. The results are set forth in Table 4.

Comparative Example 44

A lens having a composition shown in Table 4 as prepared by the same procedure as in Comparative Example 31 except that zinc stearate was replaced with hexadecanol ethyleneoxide adduct mentioned in Japanese Patent Laid-open Publication No. 81220/1985. The results are set forth in Table 4.

Comparative Example 45

A lens having a composition shown in Table 4 was prepared by the same procedure as in Comparative Example 31 except that zinc stearate was replaced with carboxyl alkylsiloxane mentioned in U.S. Pat. No. 4,220,727. The results are set forth in Table 4.

TABLE 3

| | Isocyanate (parts) | Thiol (parts) | Catalyst (parts) | Release agent (ppm) | Heating conditions of polymerization |
|---|---|---|---|---|---|
| Example 33 | m-XDI (94) | PEMP (122) | DBTDL (0.05) | DS-401 (100) | 50° C. (6 hr), 80° C. (2 hr) 90° C. (2 hr), 110° C. (2 hr) |
| Example 34 | p-XDI (100) | m-xylene-dithiol (90) | DBTDL (0.1) | QS-120 A (150) | 50° C. (6 hr), 80° C. (2 hr) 90° C. (2 hr), 110° C. (2 hr) |
| Example 35 | m-XDI (188) | 1,3,5-tris(3-mercaptopropyl) isocyanurate (140), and m-xylylenedithiol (68) | DBTDL (0.1) | DS-403 (50) and QS-120 A (100) | 50° C. (6 hr), 80° C. (2 hr) 90° C. (2 hr), 110° C. (2 hr) |
| Example 36 | m-XDI (94) | PEMP (122) | DBTDL (0.05) | EF-122 A (500) | 50° C. (6 hr), 80° C. (2 hr) 90° C. (2 hr), 110° C. (2 hr) |
| Example 37 | p-XDI 100) | m-xylene-dithiol (90) | DBTDL (0.1) | EF-126 (250) | 50° C. (6 hr), 80° C. (2 hr) 90° C. (2 hr), 110° C. (2 hr) |
| Example 38 | m-XDI (94) | PEMP (122) | DBTDL (0.05) | EF-301 (200) | 50° C. (6 hr), 80° C. (2 hr) 90° C. (2 hr), 110° C. (2 hr) |
| Example 39 | m-XDI (94) | PEMP (122) | DBTDL (0.05) | trimethylcetyl ammonium chloride (500) | 50° C. (6 hr), 80° C. (2 hr) 90° C. (2 hr), 110° C. (2 hr) |
| Example 40 | p-XDI (100) | m-xylene-dithiol (90) | DBTDL (0.1) | trimethylste-aryl ammonium chloride (1000) | 50° C. (6 hr), 80° C. (2 hr) 90° C. (2 hr), 110° C. (2 hr) |
| Example 41 | m-XDI (188) | 1,3,5-tris(3-mercaptopropyl) isocyanurate (140), and m-xylylenedithiol (68) | DBTDL (0.1) | dimethylethylcetyl ammonium chloride (2000) | 50° C. (6 hr), 80° C. (2 hr) 90° C. (2 hr), 110° C. (2 hr) |
| Example 42 | m-XDI (94) | PEMP (122) | DBTDL (0.05) | triethyldodecyl aminonium chloride (1000) | 50° C. (6 hr), 80° C. (2 hr) 90° C. (2 hr), 110° C. (2 hr) |
| Example 43 | m-XDI (94) | PEMP (122) | DBTDL (0.05) | trioctylethyl ammonium chloride (1000) | 50° C. (6 hr), 80° C. (2 hr) 90° C. (2 hr), 110° C. (2 hr) |
| Example 44 | m-XDI (94) | PEMP (122) | DBTDL (0.05) | diethylcyclo-hexyldodecyl ammonium sulfate (1000) | 50° C. (6 hr), 80° C. (2 hr) 90° C. (2 hr), 110° C. (2 hr) |
| Example 45 | m-XDI (94) | PEMP (122) | DBTDL (0.05) | diisopropyl acid phosphate (500) | 50° C. (6 hr), 80° C. (2 hr) 90° C. (2 hr), 110° C. (2 hr) |
| Example 46 | p-XDI (100) | m-xylene-dithiol (90) | DBTDL (0.1) | dibutyl acid phosphate (1000) | 50° C. (6 hr), 80° C. (2 hr) 90° C. (2 hr), 110° C. (2 hr) |
| Example 47 | m-XDI (188) | 1,3,5-tris(3-mercaptopropyl) isocyanurate (140), and m-xylylenedithiol (68) | DBTDL (0.1) | octyl acid phosphate (1000) | 50° C. (6 hr), 80° C. (2 hr) 90° C. (2 hr), 110° C. (2 hr) |
| Example 48 | m-XDI (94) | PEMP (122) | DBTDL (0.05) | dioctyl acid phosphate (1000) | 50° C. (6 hr), 80° C. (2 hr) 90° C. (2 hr), 110° C. (2 hr) |
| Example 49 | m-XDI (94) | PEMP (122) | DBTDL (0.05) | isodecyl acid phosphate (1000) | 50° C. (6 hr), 80° C. (2 hr) 90° C. (2 hr), 110° C. (2 hr) |
| Example 50 | m-XDI (94) | PEMP (122) | DBTDL (0.05) | bis(tridecyl) acid phosphate (1000) | 50° C. (6 hr), 80° C. (2 hr) 90° C. (2 hr), 110° C. (2 hr) |
| Example 51 | 1,3-bis($\alpha,\alpha$-dimethyl isocyanato methyl)benzene (172) | PEMP (122) | DBTDL (0.05) | DS-401 (100) | 50° C. (6 hr), 80° C. (2 hr) 90° C. (2 hr), 110° C. (2 hr) |
| Example 52 | p-XDI (100) | dipentaerythri-tol hexakis(3-mercaptopropio-nate) (46) | DBTDL (0.1) | QS-120A (150) | 50° C. (6 hr), 80° C. (2 hr) 90° C. (2 hr), 110° C. (2 hr) |
| Example 53 | hexamethylene diisocyanate (168) | 1,3,5-tris(3-mercaptopropyl) isocyanurate (140) and m-xylylenedithiol (68) | DBTDL (0.1) | DS-403 (50), and QS-120A (100) | 50° C. (6 hr), 80° C. (2 hr) 90° C. (2 hr), 110° C. (2 hr) |
| Example 54 | isophorone diisocyanate (223) | 1,3,5-tris(3-mercaptopropyl) isocyanurate (140), and m-xylylenedithiol | DBTDL (0.1) | dimethylethyl-cetyl ammonium chloride (2000) | 50° C. (6 hr), 80° C. (2 hr) 90° C. (2 hr), 110° C. (2 hr) |

TABLE 3-continued

| | | | | | |
|---|---|---|---|---|---|
| | | (68) | | | |
| Example 55 | m-XDI (94) | PEMP (122) | DBTDL (0.05) | DS-401 (100) | 50° C. (6 hr), 80° C. (2 hr) 90° C. (2 hr), 110° C. (2 hr) |
| Example 56 | m-XDI (94) | PEMP (122) | DBTDL (0.05) | dioctyl acid phosphate (1000) | 50° C. (6 hr), 80° C. (2 hr) 90° C. (2 hr), 110° C. (2 hr) |
| Example 57 | m-XDI (94) | PEMP (122) | — | dioctyl acid phosphate (1000) | 50° C. (6 hr), 80° C. (6 hr) 90° C. (6 hr), 110° C. (10 hr) |
| Comparative Example 25 | m-XDI (94) | PEMP (122) | DBTDL (0.05) | | 50° C. (6 hr), 80° C. (2 hr) 90° C. (2 hr), 110° C. (2 hr) |
| Comparative Example 26 | m-XDI (94) | PEMP (122) | DBTDL (0.05) | DIEFREE MS-181 (external) | 50° C. (6 hr), 80° C. (2 hr) 90° C. (2 hr), 110° C. (2 hr) |
| Comparative Example 27 | m-XDI (94) | PEMP (122) | DBTDL (0.05) | PP mold was used | 50° C. (6 hr), 80° C. (2 hr) 90° C. (2 hr), 110° C. (2 hr) |
| Comparative Example 28 | p-DXI (100) | m-xylene-dithiol (90) | DBTDL (0.1) | | 50° C. (6 hr), 80° C. (2 hr) 90° C. (2 hr), 110° C. (2 hr) |
| Comparative Example 29 | p-XDI (100) | m-xylylene-dithiol (90) | DBTDL (0.1) | DIEFREE MS-181 (external) | 50° C. (6 hr), 80° C. (2 hr) 90° C. (2 hr), 110° C. (2 hr) |
| Comparative Example 30 | p-XDI (100) | m-xylylene-dithiol (90) | DBTDL (0.1) | PP mode was used. | 50° C. (6 hr), 80° C. (2 hr) 90° C. (2 hr), 110° C. (2 hr) | m-XDI: m-xylylene diisocyanate
p-XDI: p-xylylene diisocyanate
PEMP: pentaerythritol tetrakis(3-mercaptopropionate)
DBTDL: dibutyl tin dilaurate

| | Strain | Releasability | Transparency | Surface accuracy |
|---|---|---|---|---|
| Example 33 | ○ | ○ | ○ | ○ |
| Example 34 | ○ | ○ | ○ | ○ |
| Example 35 | ○ | ○ | ○ | ○ |
| Example 36 | ○ | ○ | ○ | ○ |
| Example 37 | ○ | ○ | ○ | ○ |
| Example 38 | ○ | ○ | ○ | ○ |
| Example 39 | ○ | ○ | ○ | ○ |
| Example 40 | ○ | ○ | ○ | ○ |
| Example 41 | ○ | ○ | ○ | ○ |
| Example 42 | ○ | ○ | ○ | ○ |
| Example 43 | ○ | ○ | ○ | ○ |
| Example 44 | ○ | ○ | ○ | ○ |
| Example 45 | ○ | ○ | ○ | ○ |
| Example 46 | ○ | ○ | ○ | |
| Example 47 | ○ | ○ | ○ | ○ |
| Example 48 | ○ | ○ | ○ | ○ |
| Example 49 | ○ | ○ | ○ | ○ |
| Example 50 | ○ | ○ | ○ | ○ |
| Example 51 | ○ | ○ | ○ | ○ |
| Example 52 | ○ | ○ | ○ | |
| Example 53 | ○ | ○ | ○ | ○ |
| Example 54 | ○ | ○ | ○ | ○ |
| Example 55 | ○ | ○ | ○ | ○ |
| Example 56 | ○ | ○ | ○ | ○ |
| Example 57 | ○ | ○ | ○ | ○ |
| Comparative Example 25 | — | X | — | — |
| Comparative Example 26 | ○ | ○ | X | X |
| Comparative Example 27 | ○ | ○ | X | X |
| Comparative Example 28 | — | X | — | — |
| Comparative Example 29 | ○ | ○ | X | X |
| Comparative Example 30 | ○ | ○ | ○ | X |

TABLE 4

| | Isocyanate (parts) | Thiol (parts) | Catalyst (parts) | Release agent (ppm) | Heating conditions of polymerization |
|---|---|---|---|---|---|
| Comparative Example 31 | m-XDI (94) | PEMP (122) | DBTDL (0.05) | Zinc Stearate (5000) | 50° C. (6 hr), 80° C. (2 hr) 90° C. (2 hr), 110° C. (2 hr) |
| Comparative Example 32 | m-XDI (94) | PEMP (122) | DBTDL (0.05) | Zinc Stearate (5000) and Lauric acid (15000) | 50° C. (6 hr), 80° C. (2 hr) 90° C. (2 hr), 110° C. (2 hr) |

TABLE 4-continued

| | | | | | |
|---|---|---|---|---|---|
| Comparative Example 33 | m-XDI (94) | PEMP (122) | DBTDL (0.05) | Zinc Stearate (5000) and Lauryl acid phosphate (1000) | 50° C. (6 hr), 80° C. (2 hr) 90° C. (2 hr), 110° C. (2 hr) |
| Comparative Example 34 | m-XDI (94) | PEMP (122) | DBTDL (0.05) | Zinc Stearate (5000) and Dioctyl acid phospate (1000) | 50° C. (6 hr), 80° C. (2 hr) 90° C. (2 hr), 110° C. (2 hr) |
| Comparative Example 35 | m-XDI (94) | PEMP (122) | DBTDL (0.05) | Calcium stearate (5000) | 50° C. (6 hr), 80° C. (2 hr) 90° C. (2 hr), 110° C. (2 hr) |
| Comparative Example 36 | m-XDI (94) | PEMP (122) | DBTDL (0.05) | Dimethyl glyoxime (5000) | 50° C. (6 hr), 80° C. (2 hr) 90° C. (2 hr), 110° C. (2 hr) |
| Comparative Example 37 | m-XDI (94) | PEMP (122) | DBTDL (0.05) | Hardened castor oil (10000) | 50° C. (6 hr), 80° C. (2 hr) 90° C. (2 hr), 110° C. (2 hr) |
| Comparative Example 38 | m-XDI (94) | PEMP (122) | DBTDL (0.05) | Oleyl amide oleate (5000) | 50° C. (6 hr), 80° C. (2 hr) 90° C. (2 hr), 110° C. (2 hr) |
| Comparative Example 39 | m-XDI (94) | PEMP (122) | DBTDL (0.05) | N,N-dimethyl oleic amide (5000) | 50° C. (6 hr), 80° C. (2 hr) 90° C. (2 hr), 110° C. (2 hr) |
| Comparative Example 40 | m-XDI (94) | PEMP (122) | DBTDL (0.05) | TSF 4300 (Silicone oil) (500) | 50° C. (6 hr), 80° C. (2 hr) 90° C. (2 hr), 110° C. (2 hr) |
| Comparative Example 41 | m-XDI (94) | PEMP (122) | DBTDL (0.05) | TSF 4440 (Silicone oil) (500) | 50° C. (6 hr), 80° C. (2 hr) 90° C. (2 hr), 110° C. (2 hr) |
| Comparative Example 42 | m-XDI (94) | PEMP (122) | DBTDL (0.05) | Liquid paraffin (1000) | 50° C. (6 hr), 80° C. (2 hr) 90° C. (2 hr), 110° C. (2 hr) |
| Comparative Example 43 | m-XDI (94) | PEMP (122) | DBTDL (0.05) | $C_{18}H_{35}N\begin{cases}(C_2H_4O)_2H\\(C_2H_4O)_3H\end{cases}$ (5000) | 50° C. (6 hr), 80° C. (2 hr) 90° C. (2 hr), 110° C. (2 hr) |
| Comparative Example 44 | m-XDI (94) | PEMP (122) | DBTDL (0.05) | $C_{16}H_{33}O$–$(C_2H_4O)_{10}$–H (5000) | 50° C. (6 hr), 80° C. (2 hr) 90° C. (2 hr), 110° C. (2 hr) |
| Comparative Example 45 | m-XDI (94) | PEMP (122) | DBTDL (0.05) | $CH_3-SiO(CH_3)_2-[SiO(CH_3)_2]_{32}-[SiO(CH_3)(CH_2CHCOOH\cdot CH_3)]_8-Si(CH_3)_3$ (5000) | 50° C. (6 hr), 80° C. (2 hr) 90° C. (2 hr), 110° C. (2 hr) |

| | Optical Strain | Releasability | Transparency | Surface accuracy | Remarks |
|---|---|---|---|---|---|
| Comparative Example 31 | — | X | X | — | EP 119471 |
| Comparative Example 32 | — | X | X | — | EP 119471 |
| Comparative Example 33 | X | O | X | O | EP 119471 |
| Comparative Example 34 | X | O | X | O | EP 119471 |
| Comparative Example 35 | — | X | X | — | EP 119471 |
| Comparative Example 36 | — | X | X | — | U.S. Pat. No. 4220727 |
| Comparative Example 37 | — | X | X | — | C.A. 85(8) 47604v |
| Comparative Example 38 | — | X | X | — | BE 757939 |
| Comparative Example 39 | — | X | X | — | BE 757939 |
| Comparative Example 40 | — | X | X | — | U.S. Pat. No. 4728690 Col. 1 lines 35–38 |
| Comparative Example 41 | — | X | X | — | U.S. Pat. No. 4728690 Col. 1 lines 35–38 |
| Comparative Example 42 | — | X | X | — | U.S. Pat. No. 4728690 Col. 1 lines 35–38 |
| Comparative Example 43 | — | X | X | — | Japanese Patent Laid-open No. 51707/1985, Example 1, Internal release agent |
| Comparative Example 44 | — | X | X | — | Japanese Patent Laid-open No. 81220/1985, Example 2, Internal release agent |
| Comparative Example 45 | — | X | X | — | U.S. Pat. No. 4220727 |

Note:
m-XDI, p-XDI, PEMP and DBTDL are as defined in Table 3.

As discussed above, when a release agent is not used, the lens is not released from the mold. Furthermore, when a known external release agent which is utilized to mold a urethane resin is used, releasing is achieved, but a lens having high transparency and optical homogeneity cannot be obtained. When a polyolefin resin mold is used, a lens having good surface accuracy cannot be obtained.

Moreover, when a known internal release agent which is utilized to mold a urethane resin is used with the sulfur-containing urethane of the second aspect of the invention. (Comparative Examples 31 to 45), the resulting lens is whitely turbid and cannot be released.

On the contrary, when the surface active agent of the second aspect of the present invention is used as the internal release agent, a lens having high transparency and optical homogeneity can be obtained.

What is claimed is:

1. A process for preparing a polyurethane lens which comprises:
   (a) forming a mixture of a polyisocyanate, a polythiol, and an acid phosphoric ester selected from the group consisting of diisopropyl acid phosphate, dibutyl acid phosphate and dioctyl acid phosphate, and
   (b) subjecting the mixture containing the acid phosphoric ester obtained in step (a) to cast polymerization in a mold for a plastic lens to obtain a polyurethane lens.

2. A lens prepared by the process of claim 1.

3. A process for producing a plastic lens comprising adding at least one acid phosphoric ester as an internal mold releasing agent to a mixture of one or more polyisocyanate compounds and one or more active hydrogen compounds selected from the group consisting of polyol compounds and polythiol compounds having at least one sulfur atom in addition to the mercapto groups and conducting cast polymerization in a lens mold so as to form a plastic lens.

4. The process for producing a plastic lens of claim 3 wherein the acid phosphoric ester has i) one or two alkyl groups of 3–13 carbon atoms, ii) O= bonded to P, and iii) one or two hydroxyl groups bonded to P wherein if the acid phosphoric ester has one alkyl group then two hydroxyl groups are bonded to P and if the acid phosphoric ester has two alkyl groups then one hydroxyl group is bonded to P.

5. A plastic lens produced by the process of claim 3.

6. The process of claim 3 wherein the polyol compounds are sulfur-containing polyol compounds.

7. A plastic lens produced by the process of claim 6.

8. The process of claim 3 wherein the proportion of the polyisocyanate compound to the active hydrogen compound is a molar ratio of from about 0.5 to about 3.0 moles of functional isocyanate group per mole of functional (SH+OH) group.

9. A plastic lens produced by the process of claim 8.

10. The process of claim 3 wherein the internal mold releasing agent is present in an amount of from about 0.1 to about 10,000 ppm per sum of the polyisocyanate compound and the active hydrogen compound.

11. A plastic lens produced by the process of claim 10.

12. The process of claim 3 wherein cast polymerization is carried out at a temperature of from about −50° C. to about 200° C.

13. The process of claim 3 wherein the acid phosphoric ester is selected from the group consisting of isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecyl acid phosphate and bis(tridecyl) acid phosphate.

14. A process for preparing a sulfur-containing urethane resin lens which comprises pouring a mixture of polyisocyanate having two or more isocyanato groups, polythiol having two or more thiol groups, and one or more acidic phosphate esters into a mold made of a glass or metal, heating and cast polymerizing the same.

15. The process for preparing a sulfur-containing urethane resin lens of claim 14 wherein the acid phosphoric esters has i) one or two alkyl groups of 3–13 carbon atoms, ii) O= bonded to P, and iii) one or two hydroxyl groups bonded to P wherein if the acid phosphoric ester has one alkyl group then two hydroxyl groups are bonded to P and if the acid phosphoric ester has two alkyl groups then one hydroxyl group is bonded to P.

16. The process for preparing a sulfur-containing urethane resin lens of claim 14 wherein said polyisocyanate is one or more polyisocyanates selected from the group consisting of aliphatic polyisocyanates, aliphatic polyisocyanates having an aromatic ring and alicyclic polyisocyanates.

17. The process for preparing a sulfur-containing urethane resin lens of claim 15 wherein said aliphatic polyisocyanate, aliphatic polyisocyanate having an aromatic ring or alicyclic polyisocyanate is one or more polyisocyanates selected from the group consisting of xylylene diisocyanate, bis($\alpha,\alpha$-dimethyl isocyanato methyl)benzene, isophorone diisocyanate and hexamethylene diisocyanate.

18. The process for preparing a sulfur-containing urethane resin lens of claim 14 wherein said polythiol is at least one polythiol selected from the group consisting of aliphatic polythiols, alicyclic polythiols, polythiols having an aromatic ring, polythiols having a heterocyclic ring and halogen-substituted compounds of these polythiols.

19. The process for preparing a sulfur-containing urethane resin lens of claim 18 wherein said polythiol is a polythiol having at least three thiol groups.

20. The process for preparing a sulfur-containing urethane resin lens of claim 14 wherein said polythiol is one or more polythiols selected from the group consisting of pentaerythritol tetrakis(3-mercapto-propionate), dipentaerythritol hexakis(3-mercapto-propionate), xylylenedithiol and 1,3,5 tris(3-mercapto-propyl) isocyanurate.

21. The process for preparing a sulfur-containing urethane resin lens of claim 14 wherein said surface active agent is present in an amount of from about 1 ppm to about 10,000 ppm with respect to the total weight of the polyisocyanate and the polythiol.

22. The process for preparing a sulfur-containing urethane resin lens of claim 14 wherein said surface active agent is present in an amount of from about 1 ppm to about 5,000 ppm with respect to the total weight of the polyisocyanate and the polythiol.

23. The process for preparing a sulfur-containing urethane resin lens of claim 14 wherein the ratio of said polyisocyanate to said polythiol is from about 0.5:1.0 to about 3.0:1.0 in terms of an NCO/SH equivalent ratio.

24. The process for preparing a sulfur-containing urethane resin lens of claim 14 wherein the ratio of said polyisocyanate to said polythiol is from about 0.5:1.0 to about 1.5:1.0 in terms of an NCO/SH equivalent ratio.

25. The process for preparing a sulfur-containing urethane resin lens of claim 14 wherein the acid phosphoric ester is selected from the group consisting of isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecyl acid phosphate and bis(tridecyl) acid phosphate.

26. A lens prepared by the process of claim 14.

* * * * *